N. MARY.
APPARATUS FOR TREATING WOOL.
No. 182,209. Patented Sept. 12, 1876.
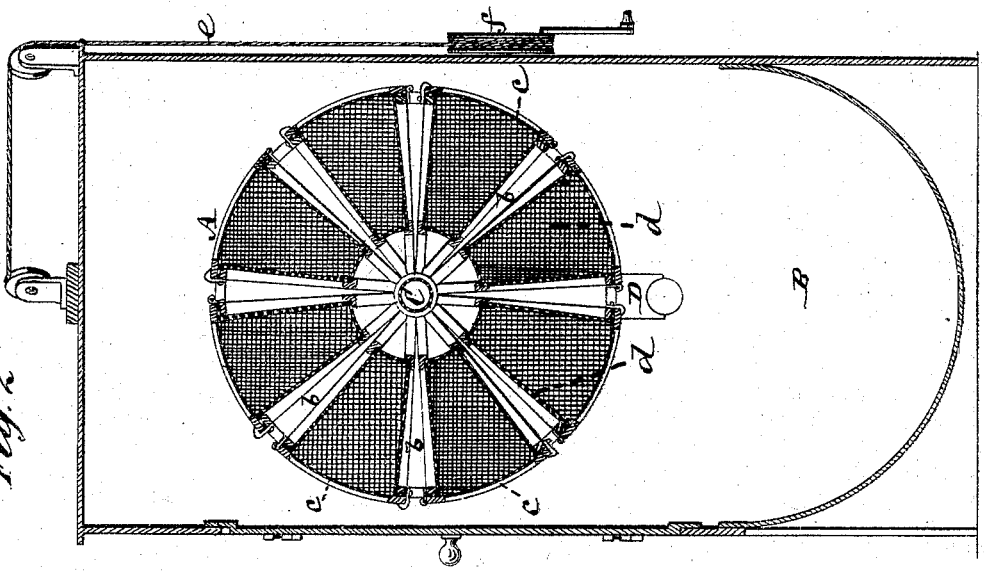
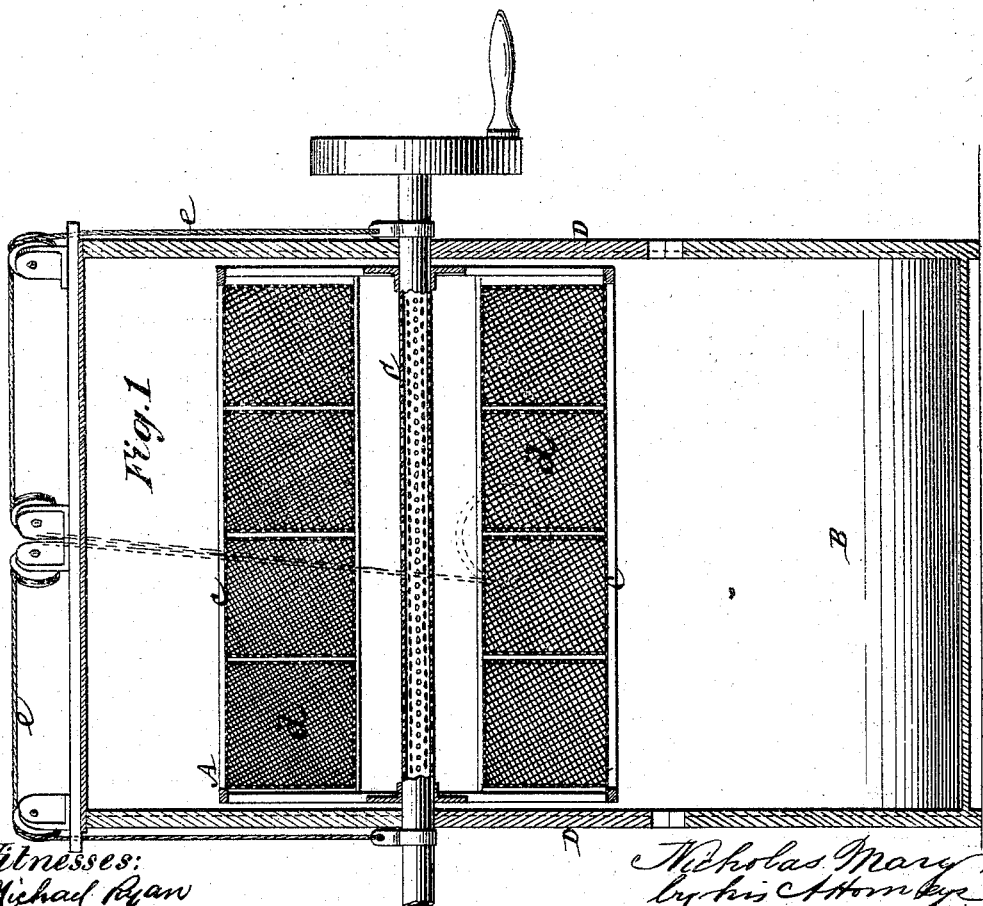

UNITED STATES PATENT OFFICE.

NICHOLAS MARY, OF BOSTON, MASSACHUSETTS, ASSIGNOR OF ONE-HALF OF HIS RIGHT TO ANDREW J. CLEMENT, OF SAME PLACE.

IMPROVEMENT IN APPARATUS FOR TREATING WOOL.

Specification forming part of Letters Patent No. 182,209, dated September 12, 1876; application filed July 10, 1876.

*To all whom it may concern:*

Be it known that I, NICHOLAS MARY, of Boston, in the county of Suffolk and State of Massachusetts, have invented an Improved Apparatus for the Treatment of Wool for the Destruction of Vegetable Matters contained therein and the abstraction of such matters therefrom; and I do hereby declare that the following is a full, clear, and exact description of the same, reference being had to the accompanying drawing, which forms part of this specification.

This invention has for its object the successful employment of acids for destroying the vegetable matters contained in raw wool— that is, wool in the fleece—regardless of the description of acid used, and which may either be mineral or vegetable, including all the chlorides, such as those of iron, zinc, magnesium, or aluminum, and various fatty inflammable bodies which destroy the vegetable matter without destroying the animal matter.

The invention consists in certain novel constructions of reticulated receptacle or receptacles, and in the apparatus for treating the wool with the acid, whereby the desired effects are produced in the most satisfactory manner.

Figures 1 and 2 represent sectional elevations, in planes at right angles with each other, of an apparatus for treating the wool with the acid, including what I term a hydro-acidulating centrifugal wheel, the same forming a closed rotary reticulated receptacle for the wool.

A is the rotary reticulated receptacle, which may be of any desired size, both as regards its length and diameter. This receptacle or wheel is divided into or composed of any number of longitudinal compartments or sections, arranged radially around the wheel, with spaces $b$ in between said compartments, which latter are of a perforated or reticulated construction on their sides, and are closed by lids $c$, of a like construction. These perforated compartments may be made up of a series of separated or loose and removable baskets, $d$, resting on bars, which form a skeleton-frame for the more convenient handling and treating of the wool in detached masses contained within the baskets, and closed by the lids $c$. This wheel A has its axle or journal supported in bearings in the sides of a lead-lined vat, B, containing the acidulated bath, into which the said wheel dips to a depth equal to about half its diameter, when it is required to immerse the same. The axle C of said wheel may be of a tubular construction, and have a series of perforations throughout its length, to provide for drenching the wool from the center of the wheel with acid, when required, as hereinafter referred to.

To facilitate the raising of the wheel out of the acid in the bath, when required, the axle C has its bearings in removable blocks D D in the sides of the vat, and the wheel is suspended by cords or chains $e\,e$, attached at their one end to the axle, and passing over pulleys to a windlass, $f$, whereby the wheel may be conveniently raised or lowered, as required, the blocks or bearings D D being removed when lowering the wheel.

The application of the acid to the wool in the wheel A can be made in one or other of two different ways, according to the quality of the wool under treatment and nature of the foreign matters which require to be removed, or the varying difficulty which they present as regards removal. Thus, for fine wools having but little foreign matter in them, a simple immersion and series of rotations in the acid of the wheel A containing the wool will suffice, said acid being heated to about 30° Reaumur, (more or less,) and the wheel A being slowly revolved therein, and so that its compartments containing the wool are alternately submerged within and raised from the bath, about half the number of compartments being at all times submerged. The wool, being removed from the bath by the rotation of the wheel, receives the air and so dilates itself that on re-entering the bath it takes the acid with greater facility. This operation of rotation is continued for from one to two hours, (more or less,) according to the quality of the wool and the nature and extent of the impurities contained in it. When the quality of the wool and the impurities contained therein are coarse, then the acid supplying the bath may be introduced through the perforated axle C, and be projected by a centrifugal force through the wool, causing it to penetrate or act upon the heaviest impurities.

The importance of this mode of operation will be readily understood when it is remembered that while the wool does not absorb more than one per cent. of acid, vegetable matter contained in it absorbs three per cent., more or less.

After the wool in the compartments of the wheel has been sufficiently exposed to the acid, said wheel is raised from the bath and caused to rotate rapidly to discharge the moisture from the wool. The wool is then removed from the wheel A and placed in a "hydro-extractor" for five minutes (more or less) in order that it may be well drained. It does not then contain more than twenty-five per cent., or thereabout, of the acidulated liquid.

The wool thus treated with the acid is then placed in a carbonizing apparatus, or rather, in one or more closed reticulated receptacles having a rotary or other suitable motion corresponding with the wheel A, hereinbefore described, excepting that the perforated hollow axle C is dispensed with. This carbonizing receptacle or wheel permits of the heat penetrating equally the several fibers of the wool, and allows of every portion of the latter, while inclosed in the compartments of the wheel, being exposed to an equal temperature, the degree of which may vary with the requirements of the operation.

In order that the carbonization may reach any degree desired to make pulverization easy, I propose to arrange the carbonizing-wheels in a chamber, which may be heated by steam-pipes, arranged at a suitable distance around or outside of the wheels within said chamber. This chamber may be divided into two compartments, one of which may be a simple receiving and discharging chamber for the wheels containing the wool, and the other of which, in which said wheels are rotated, is a hot chamber, and may be constructed of planks, lined with felt, to retain the heat necessary for carbonization. The carbonizing-wheels are slowly revolved in said chamber. A rotary fan-blower is arranged upon this chamber, for expelling, through holes in the bottom of the latter, the vapors which result from the ebullition which takes place in the wool during the early stage of carbonization. As soon as the wool is dry the fan is stopped and the apertures for escape of the vapors closed, and the temperature increased in the carbonizing-chamber to any desired degree to effect carbonization, which may occupy from one to two hours. The wool is then removed from the carbonizing wheel or wheels, and subjected to the action of a "devil" or picker, or, preferably, to a suitable centrifugal machine, for the detachment and separation of the carbonized particles, after which it is washed, to further clean it, and to remove the acid from it, and to revive the wool.

The washing apparatus is substantially similar to the apparatus for treating the wool with acid, so far as the employment of one or more reticulated closed receptacles or wheels containing the wool, and a vat for the same to work or rotate in, are concerned; but the vat does not require to be lined with lead, and the longitudinal perforated or reticulated compartments of the wheel or wheels need not be divided up into a series of baskets, but may be continuous throughout the length of the wheel.

The water in which the washing-wheel, or, as it may be termed, "disacidulator," rotates, may be heated in the first instance to 30° or 35° centigrade, to insure the proper opening or dilation of the fibers of the wool. A supply of fresh cold water is then introduced through a perforated pipe in the bottom of the vat, and projected into the wool in the wheel, as the latter is rapidly rotated, suitable overflow-openings being made in the vat for the superfluous water. This causes the acidulated water and the impurities washed out of the wool to pass steadily off. Such operation may be continued for about fifteen minutes, (more or less,) when the water, being dirty in the bath, is drawn off. The wheel is then rapidly rotated to effect a drying or draining of the wool.

To restore life to the wool, an alkaline bath may be prepared in the same vat, and the wheel containing the wool turned slowly to insure thorough penetration. This may be continued for about twenty minutes, more or less, after which the bath is emptied, and the wheel rapidly rotated to effect another draining or drying. The wool in the wheel is then subjected to a third bath of inflowing fresh water to clear or rinse it. If necessary in order to effect a thorough cleaning, the axle of the wheel may be made hollow, and be perforated, and water be ejected by centrifugal force through the wool from the center of the wheel, as in the case of the apparatus for treating the wool with acids.

In all of these several operations it will be observed that the wool is treated in detached bodies or masses, in a closed reticulated receptacle.

I claim—

1. The closed reticulated receptacle or wheel A, constructed in compartments having perforated sides, and with spaces $c$ between them, essentially as and for the purpose herein set forth.

2. The closed reticulated receptacle or wheel A, constructed in compartments composed of perforated baskets $d$, substantially as shown and described.

3. The combination of the perforated hollow axle C, with the closed reticulated receptacle or wheel A, formed of reticulated compartments, essentially as specified.

4. The combination, with the vat B, of the removable blocks or bearings D D, and the raising and lowering closed reticulated receptacle or wheel A, substantially as shown and described.

NICHOLAS MARY.

Witnesses:
W. PELLETIER,
E. H. BAILEY.